United States Patent [19]

Hill et al.

[11] 3,921,445

[45] Nov. 25, 1975

[54] FORCE AND TORQUE SENSING METHOD AND MEANS FOR MANIPULATORS AND THE LIKE

[75] Inventors: John W. Hill, Palo Alto; Antony J. Sword, San Francisco, both of Calif.

[73] Assignee: Stanford Research Institute, Menlo Park, Calif.

[22] Filed: Oct. 15, 1973

[21] Appl. No.: 406,553

[52] U.S. Cl............................................ 73/133 R
[51] Int. Cl............................................... G011 5/16
[58] Field of Search ... 73/133 R; 250/231 R, 231 P; 244/83 E; 214/1 CM

[56] References Cited
UNITED STATES PATENTS

| | | | |
|---|---|---|---|
| 2,866,333 | 12/1958 | Dudenhausen | 73/141 A |
| 3,090,226 | 5/1963 | Corti et al. | 73/141 A |
| 3,308,303 | 3/1967 | Weichselbaum et al. | 250/231 R |
| 3,521,072 | 7/1970 | Wipson et al. | 250/231 R |
| 3,561,263 | 2/1971 | Ward et al. | 73/133 R |
| 3,598,999 | 8/1971 | Hofmeister | 250/231 R X |
| 3,612,881 | 10/1971 | King | 250/231 P UX |
| 3,628,394 | 12/1971 | Keatinge | 244/83 E X |
| 3,640,130 | 2/1972 | Spescha et al. | 73/133 R |
| 3,693,425 | 9/1972 | Starita et al. | 73/133 R |

FOREIGN PATENTS OR APPLICATIONS

| | | | |
|---|---|---|---|
| 656,926 | 9/1951 | United Kingdom | 73/133 R |

*Primary Examiner*—Charles A. Ruehl
*Attorney, Agent, or Firm*—Victor R. Beckman

[57] ABSTRACT

A manipulator is shown of the type which includes an effector, such as a hand, comprising a pair of jaws relatively pivotally movable between open and closed positions under operation of power means such as an electric motor. Sensing means, for sensing both magnitude and direction of forces along three mutually orthogonal axes intersecting at the wrist and for sensing magnitude and direction of torques about said axes, are provided at the wrist intermediate to the manipulator hand and hand supporting means. The sensing means includes a plurality of sensing units radially spaced from the longitudinal axis of the manipulator at equal distances therefrom. In an exemplary arrangement, four such orthogonally located sensing units are employed, each of which includes a radially extending opaque pin carried by the manipulator arm or hand. Each pin extends into a clearance hole formed in an energy source and detector housing carried by the other of the arm and hand. The housings also are formed with passages which intersect the pin receiving hole and along which passages an associated energy source and energy detector are located, with the energy from the source being directed toward the energy detector. A portion of the energy from each of the sources is blocked by the pin such that only the unobstructed portion of the energy from the source reaches the detector. The amount of shadowing of energy by the pins depends upon forces and torques applied to the hand, and the outputs from the detectors are combined in such a manner as to provide output signals representative of the three components of force at the wrist corresponding to reach, lift and sweep directions of hand motion and the three components of torque corresponding to twist, turn and tilt of the hand. Also, the hand and power means for operation of the hand are located at opposite sides of the wrist, such that the power means functions as a counterweight to balance the weight of the hand. Consequently, the hand weight is not reflected in the outputs of the torque sensors.

23 Claims, 12 Drawing Figures

FORCE AND TORQUE SENSING METHOD AND MEANS FOR MANIPULATORS AND THE LIKE

The invention described herein was made in the course of work under a grant or award from the United States National Science Foundation.

BACKGROUND OF INVENTION

Position controlled manipulators for industrial and scientific use are well known and often are used in automatic operations of manufacture, assembly, etc. Control systems for the automatic control and/or operation of manipulators may be of the open loop or closed loop type. Closed loop systems generally necessitate the use of a computer, such as a digital computer, to handle the necessary coordinate conversions, control equations and completion criteria. To carry out an assigned manipulative task requires the sensing of torques and forces at various manipulator locations. Forces or torques at the joints of the manipulator may be sensed by measuring the current supplied to driving motors or the back pressure in hydraulic systems used to operate the joints. Such joint force measurements are of limited usefulness, however, for a number of reasons including contamination by both the weight of the manipulator segments and the weight of the load and the presence of friction in the back drivability of individual joints. For example, depending on the gearing employed, more than 10 percent of the force exerted by a joint may be required to back drive the same. The use of joint forces, therefore, is best suited to the detection of collisions of the manipulator with obstacles encountered during a task.

Another means of measuring contact between the manipulator end effector (such as manipulator hand) and the environment is to measure the force couple at some point on the manipulator, preferably as close to the end effector as possible. The force couple consists of a torque vector and a force vector describing the reaction at said point. By sensing of the force couple at the wrist, gravitational and acceleration loading on the manipulator components behind the wrist have no effect on the sensing mechanism, and only gravity and acceleration loading from the combined mass of the end effector (e.g., hand) and object gripped determine the force couple at the wrist. A computer controlled arm employing wrist sensing means is shown, for example, in the article entitled "Force Feedback of a Teleoperator System" by R. C. Groome, Jr., MIT Charles Stark Draper Lab. Report T-575, Cambridge, Mass., August 1972. The present invention is directed to a greatly simplified wrist sensor adapted for operation over a wide load range.

SUMMARY OF INVENTION

An object of this invention is the provision of improved sensing method and means for sensing torque and force vector quantities, which sensing method and means are particularly adapted for use as a wrist sensor of a manipulator.

An object of this invention is the provision of a simplified method and means for sensing torques about three orthogonal axes and forces along said axes, in which each torque and force measurement is substantially independent of every other measurement.

An object of this invention is the provision of a manipulator which is provided with force and torque sensing means in which said torque and force sensing means are substantially unresponsive to the weight of the manipulator hand.

The above and other objects and advantages are achieved by use of a plurality of sensing units positioned a radially spaced distance from the longitudinal axis of a resilient coupling means connecting supported and supporting members such as a manipulator hand and hand supporting means. The sensing units each have relatively movable sections attached to the resilient coupling means so that movement therebetween is produced upon transmission of forces and force movements through the coupling means. Signals are produced by the sensing units, which signals are related to components of relative movement of the sensor sections in two orthogonal directions mutually orthogonal to the direction of the radius to the sensing unit. The sensing units are insensitive to relative radial movement of the sensing sections. Signals from sensing units are combined to obtain outputs indicative of at least one component of the force and torque components present at the coupling means. The sensing units may include potentiometers, photocells, split photocells, or the like. In accordance with another feature of this invention, the drive motor for actuation of the end effector is fixedly secured thereto and is located at the opposite side of the resilient coupling from the end effector to counterbalance the same. Consequently, torque signals provided by the sensing arrangement are uncontaminated by the weight of the hand.

BRIEF DESCRIPTION OF DRAWINGS

In the drawings, wherein like reference characters refer to the same parts in the several views.

DESCRIPTION OF PREFERRED EMBODIMENTS

Figure 1:
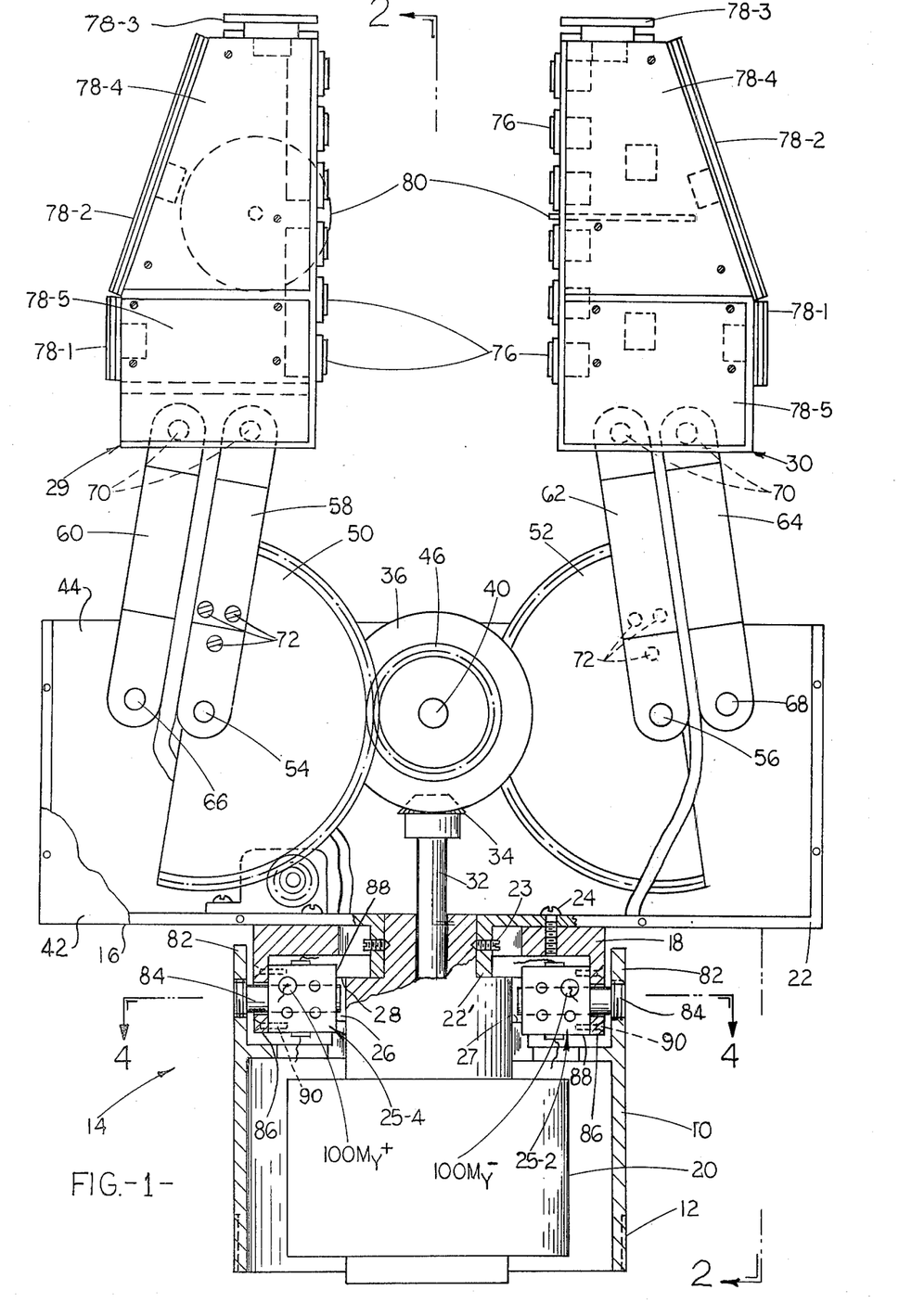
FIG. 1 is a plan view of a novel manipulator embodying this invention, showing portions of the wrist sensor and jaw actuating mechanism broken away for clarity.
Figure 2:
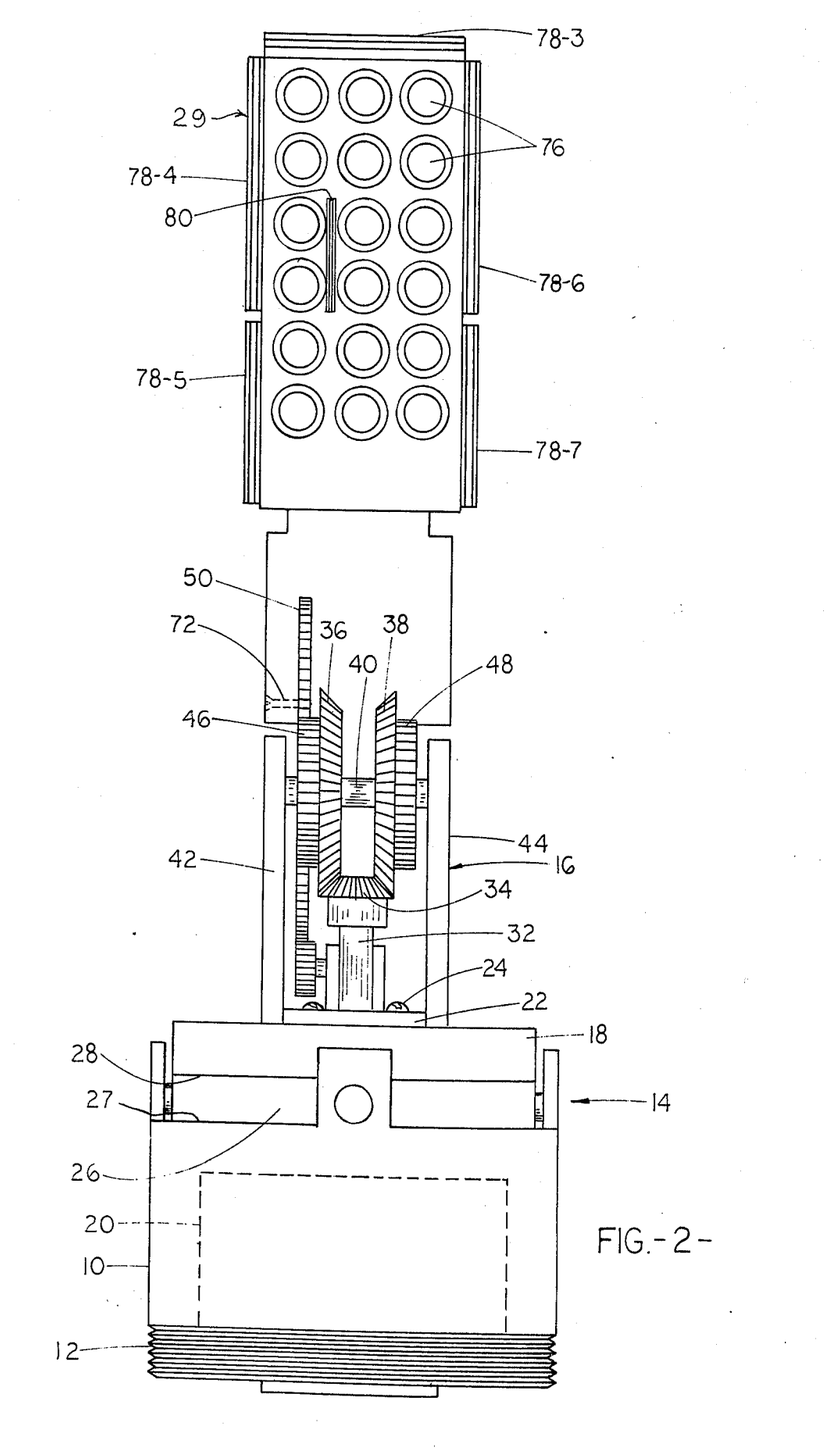
FIG. 2 is a view taken substantially along line 2—2 of FIG. 1.
Figure 3:
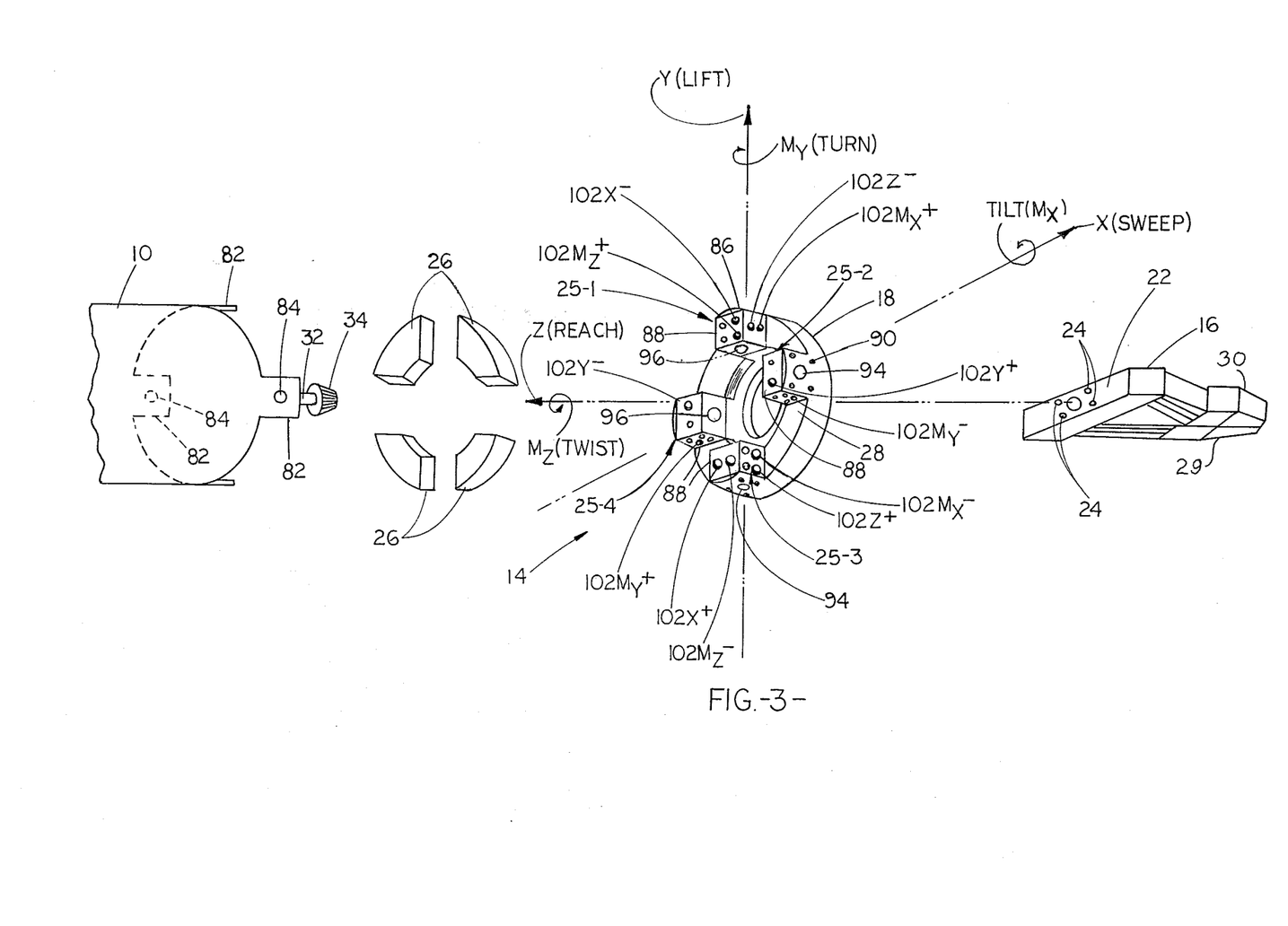
FIG. 3 is a fragmentary exploded view of the manipulator and including an identification of the wrist axes and the forces along and torques about which axes the wrist sensing means are responsive.

Reference now is made to FIGS. 1, 2 and 3 of the drawings wherein the manipulator is shown comprising a hand supporting member 10 adapted to be coupled by threads 12 to a robot, automated machinery, earth, space or underwater vehicle, or the like (not shown) such as are presently in use. The member 10 is coupled through the novel wrist sensing means of this invention, identified generally by the reference numeral 14, to a gear box or housing 16 included in the manipulator hand. A detailed description of the wrist sensing means is contained hereinbelow.

For present purposes, it will be understood that the wrist sensor includes a ring 18, one side of which is secured to the base 22 of the housing 16 as by screws 24 extending through holes in the base into threaded holes in the ring to secure the base and ring together. A reversible motor 20 is secured to this assemblage by means of screws 23 extending through threaded holes in a flange 22' on the base 22 of the housing 16 into holes in the motor base. Resilient coupling means 26, such as pads of rubber or like resilient material, are cemented or otherwise suitably secured between the forward face 27 of the member 10 and rearward face 28 of the ring 18 to secure the ring 18 (with the attached gear housing 16 and motor 20) to the member 10. The resilient coupling means 26 are deformed upon transmission of forces therethrough, and orthogonally positioned sensing units 25-1, 25-2, 25-3 and 25-4 located adjacent the coupling means provide a measure of the force and torque at the intersection of the X, Y and Z axes identified in FIG. 3.

The reversible motor 20 serves to open and close a pair of jaws 29 and 30 through a suitable gear and linkage mechanism which now will be described. The motor shaft 32 extends through the ring 18 and an aperture in the base plate 22 and into the housing 16. A pinion 34 at the forward end of the motor shaft engages a pair of inwardly facing bevel gears 36 and 38 which are independently rotatably supported on a shaft 40 extending between the upper and lower walls 42 and 44, respectively, of the housing 16, as seen in FIG. 2. The upper wall 42, which is removable to facilitate assembly, is shown broken away for clarity in FIG. 1. Attached to or fromed on the bevel gears 36 and 38 at the outer sides thereof are spur gears 46 and 48 which engage sector gears 50 and 52, respectively, for drive actuation thereof. The sector gears 50 and 52 are rotatably mounted on shafts 54 and 56, respectively, extending between the upper and lower walls of the housing 16.

A first pair of parallel links 58 and 60 connect the one jaw 29 to the gear housing 16, and a similar second pair of parallel links 62 and 64 connect the other jaw 30 to the housing. At the housing the links 58 and 62 are pivotally supported on the shafts 54 and 56 about which the sector gears pivot. The links 60 and 64 are pivotally mounted on shafts 66 and 68 between the housing walls 42 and 44. Pins 70 connect the forward ends of the links 58, 60, 62 and 64 to the jaws 29 and 30. The inner links 58 and 62 are slotted to receive the sector gears 50 and 52, respectively, and screws 72 secure the links to the gears.

Operation of the jaws 29 and 30 between open and closed position, although believed to be apparent, will now be briefly described. When the motor 20 is energized for rotation of the bevel gear 34, the meshing bevel gears 36 and 38 are counterrotated. The counterrotating gears 36 and 38 drive the gear segments 50 and 52 in counterrotating directions through the spur gears 46 and 48. The links 58 and 62 attached to the gear segments are thereby counterpivoted for closing or opening of the jaws. The links 60 and 64, which are parallel to the driven links 58 and 62, respectively, maintain the jaw faces in parallel relation.

The jaws 29 and 30 may be of a generally hollow construction to accommodate force sensors having actuating means at the jaw faces. As seen in FIGS. 1 and 2, the inner facing walls of the jaws may be provided with 18 force transducers actuated by a 3×6 array of actuating members such as buttons 76. Other force transducers are included which are under control of actuating plates 78-1 through 78-7 at other jaw surfaces. Also, mounted within the jaws and extending from the inner jaw faces are slip sensors 80 which are orthogonally positioned for sensing object slip transversely and longitudinally of the jaw faces. The force and slip sensors are disclosed and claimed in a copending patent application being filed concurrently herewith and entitled "Manipulator with Electromechanical Transducer Means", which application is assigned to the assignee of the present application by the inventors, John W. Hill and Antony J. Sword. The subject matter of the copending application is specifically incorporated herein by reference.

The novel wrist sensing means of this invention includes, as mentioned above, the four sensing units 25-1, 25-2, 25-3 and 25-4 located along the X-Y axes thereof. The Z axis of the three mutually orthogonal axes extends along the longitudinal center of the manipulator. The sensing means functions to sense the direction and magnitude of forces acting along the three axes and the direction and magnitude of the force moments thereabout. Where the sensing means are employed in a manipulator, as shown in FIGS. 1–7 of the drawings, the forces along the X, Y and Z axes comprise sweep, lift and reach forces, respectively, and the force moments thereabout comprise tilt, turn and twist torques, respectively. In FIG. 3, arrows indicating positive direction of torque about the X, Y and Z axes are identified as $M_x$, $M_y$ and $M_z$, respectively.

Figure 4:
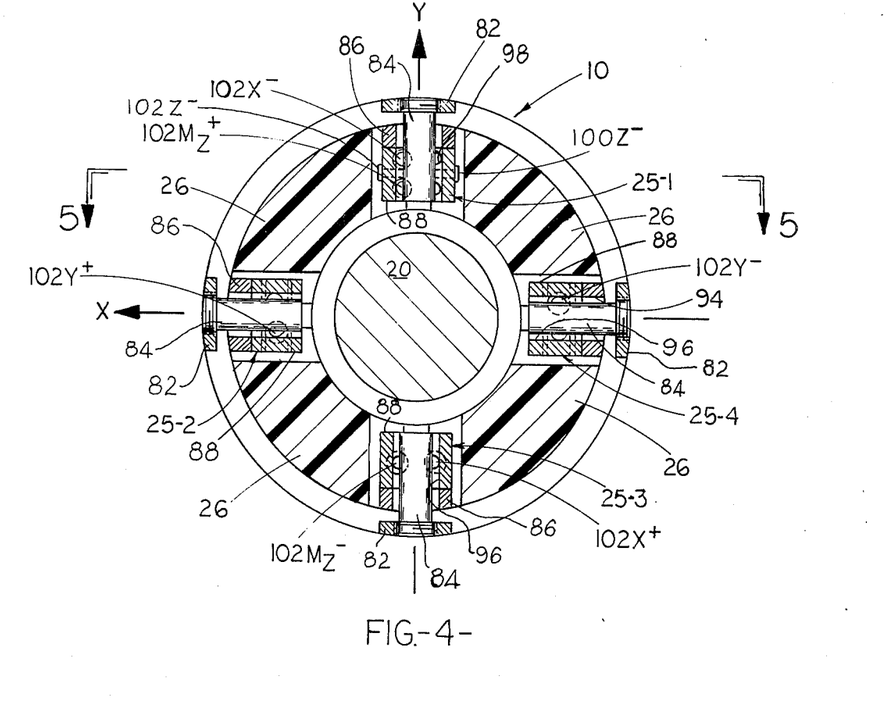
FIG. 4 is a sectional view taken along line 4—4 of FIG. 1.

As best seen in FIGS. 1, 3 and 4, the member 10 comprises a cylindrically shaped housing having at the forward end thereof forwardly extending quadrature spaced arm members 82. Threaded holes are formed through the arms 82 for the support of radially extending opaque pins 84 having enlarged threaded heads in threaded engagement with the threaded holes. The pins, as will become apparent hereinbelow, function to block varying amounts of light along light paths extending generally tangentially to the pins, with the amount of light passing thereby being dependent upon the forces and torques at the sensor. The ring 18 similarly is provided with rearwardly extending quadrature spaced arm members 86 radially spaced from the arms 82. In the illustrated arrangement, the arms 86 are inwardly radially spaced from the arms 82 and support housing members 88, which are attached thereto by screw fasteners 90 extending through symmetrically located holes in the arms and engaging threaded holes 92 (see FIG. 6) in the housing members. The arms 86 and attached housings 88 are formed with colinear clearance holes 94 and 96, respectively, into which the opaque pins 84 axially extend. The pins are spaced from the hole walls to allow for displacement of the normally coaxially extending pin and hole axes in operation.

Figure 6:
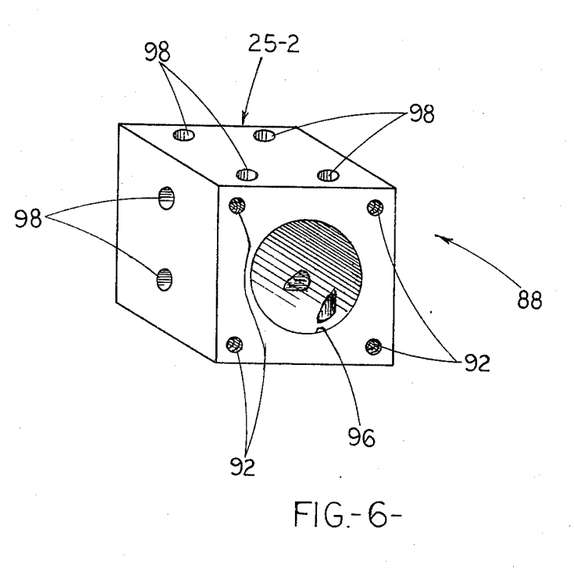
FIG. 6 is an enlarged perspective view of one of the sensor unit housings.

For simplicity of manufacture all of the housing members 88 may be of identical construction comprising, in addition to the mounting holes 92 and pin receiving hole 96, light passages 98 extending therethrough. The light passages 98 intersect the pin receiving aperture 96, with the axes thereof extending substantially tangentially of the pin 84 when the pin and aperture 96 are coaxially located. In the illustrated arrangement there are four parallel extending light passages which terminate at one pair of opposite faces of the generally cubical housing 88 and two parallel extending light passages which terminate in another pair of opposite housing faces, with none of the light passages intersecting any other light passage. In attaching the housings 88 to the arms 86, one housing 88 (at sensing unit 25-1) is arranged with the four light passages 98 extending parallel with the longitudinal Z axis, and the other three housings 88 (at sensing units 25-2, 25-3 and 25-4) are arranged with the two parallel light passages extending parallel with the Z axis.

Not all of the light passages are utilized in the sensing operation but, as mentioned above, are formed in the housings 88 for uniformity and simplicity of construction. Certain passageways are provided with light source and light sensing means identified generally by reference numerals 100 and 102, respectively, at opposite ends of the passageways. The light source and sensing means may comprise, for example, light emitting diodes and phototransistors, respectively, although it will be apparent that the invention is not limited to the use of such means. To differentiate between the various light source and sensing means in the description and drawings, the reference numerals 100 and 102 are followed by abbreviations for identification of the force or torque sensed thereby together with a plus or minus sign for indicating direction thereof. For example, reference characters $102X^+$ and $102X^-$ identify the two sensing means used in the measurement of forces along the X axis. Similarly the reference characters $102M_x$ and $102M_x$ identify those sensing means used in the measurement of the moments of force (i.e., torque) about the X axis. The light source and sensing means employed in the force and torque measurements about the Y and Z axes are similarly identified.

Figure 5:
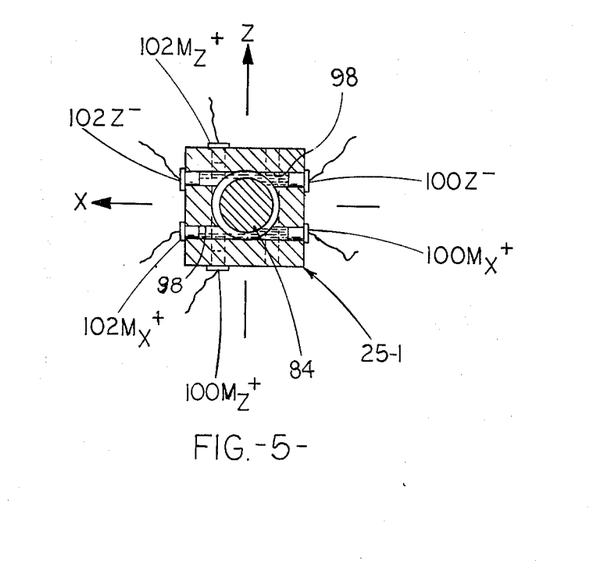
FIG. 5 is a sectional view taken substantially along line 5—5 of FIG. 4 showing one of the sensing units.

As noted above, the axes of the light passages extend substantially tangentially of the opaque pins 84 in the neutral, central position of the pins within the clearance holes 96. In this position, as seen in FIGS. 4 and 5, the pins shield approximately half the light from each source 100, preventing the shielded portion from reaching the associated photocell at the opposite end of the passageway. That is, the shadow of the pin covers approximately one half the active face of the associated photocell, with the pin centrally axially located in the clearance hole. Movement of the opaque pin within the clearance hole toward or away from the light beam increases of decreases the shielding effect by the pin to decrease and increase, respectively, the amount of light reaching the associated photocell. Where the photocells comprise phototransistors, the output therefrom increases with an increase in light received.

It will here be noted that any change in the amount of light from a light source passing a pin 84 is dependent upon that component of relative movement of the pin axis toward or away from the light beam axis and is substantially independent of movement in any other direction. Referring to FIG. 5, for example, it will be apparent that movement of the pin 84 to the left along the X axis will block more light from the source $100M_z^+$, thereby casting a larger shadow in the photocell $102M_z^+$ to decrease the photocell output. Movement of the pin along the Z axis merely moves the pin along the light beam axis between the source $100M_z^+$ and sensor $102M_z^+$ without producing a significant change in the amount of light passing the pin. Similarly, movement of the pin along the Y axis, into or out of the plane of the drawing figure, has no effect on the light passage between said source $100M_z^+$ and sensor $102M_z^+$. It will further be noted that relative movement between the opaque pin and light beam axes toward or away from each other may be effected by either relative translational movement along one manipulator axis or by relative rotational movement about the center of the sensor in the plane extending transversely to the light beam axis, whereby both force and torque vector sensing about the X, Y and Z axes is possible, as will now be described.

The translational and rotational movements about the three orthogonal manipulator axes are independently sensed by use of pairs of properly located light sensors at diametrically opposite sensor units. Reference is made to FIG. 3 wherein the sensors $102X^+$ and $102X^-$ at the diagonally opposite units 25-3 and 25-1, respectively, along the Y axis are shown for sensing light along light beam axes extending parallel with the Z axis. The sensors are located at opposite sides of the Y-Z plane, that is, the plane determined by the intersecting Y-Z axes. In the drawings the sensors $102X^-$ and $102X^+$ are shown located to the side of the Y-Z plane in the positive and negative X axis directions, respectively. With no X direction (i.e., sweep) force on the manipulator, the outputs from the photocells $102X^+$ and $102X^-$ are equal. A sweep force, however, will produce a differential change in the photocell outputs. For example, a force in the positive X direction will result in translational movement along the X axis of the pins 84 within the housings 88, whereupon the light reaching the photocell $102X^+$ increases whereas the light reaching th photocell $102X^-$ decreases. Conversely, a sweep force in the opposite direction will result in a lower output from the photocell $102X^+$ and a higher output from the photocell $102X^-$.

The outputs from the pair of photocells $102X^+$ and $102X^-$ are connected to or included in a differential circuit having no output when the photocell outputs are equal and having an output of one or the other polarity dependent upon which photocell output is the largest. Where the photocells $102X^+$ and $102X^-$ comprise phototransistors, a simple circuit such as that shown in FIG. 7 may be employed. There, the phototransistor emitter and collector electrodes are shown connected in series circuit between positive and negative 15 volt supplies. With equal light impingement on the phototransistors, equal currents flow therethrough, whereby the potential at the output terminal 106 is zero. If more light strikes one phototransistor than the other, a positive or negative output voltage is produced, depending upon which phototransistor is most conductive, the magnitude of which output depends upon the light difference at the phototransistors.

Figure 7:
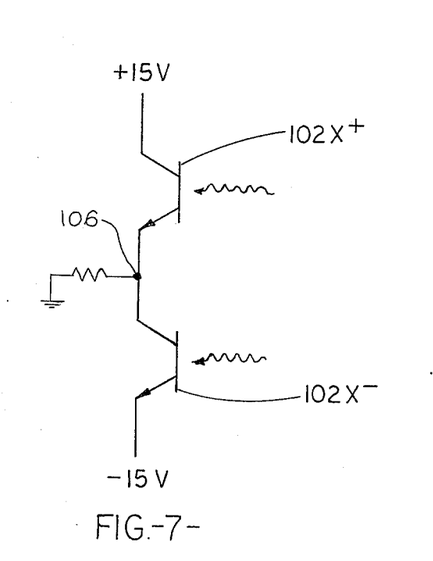
FIG. 7 is a schematic circuit diagram showing a pair of photocells connected together in a difference circuit arrangement.

It will be seen that lift and reach forces on the manipulator produce no change in the sweep sensing photocell $102X^+$ and $102X^-$ outputs since, as noted above, such forces result in relative movement of the opaque pins and associated light beam axes having no component in the X direction to change the distance between the light beam axes and pins. Similarly, it will be seen that tilt and turn torques produce no substantial changes in the photocell $102X^+$ and $102X^-$ outputs. A twist force moment (i.e., torque about the Z axis) will change the photocell $102X^+$ and $102X^-$ outputs. Note, however, that since the photocells $102X^+$ and $102X^-$ are located at opposite sides of the Y-Z plane, the photocell outputs change in the same direction the same amount. For example, with a positive twist more light is received by both photocells $102X^+$ and $102X^-$, whereby the outputs therefrom increase. However, since the photocells are connected in an electrical difference circuit arrangement, as shown in FIG. 7, there is no resultant output change at the output terminal 106 with equal changes in current flow through the phototransistors. Consequently, sweep force sensing by the photocells $102X^+$ and $102X^-$ also is substantially immune to torque about the Z axis.

The lift sensing photocells $102Y^+$ and $102Y^-$ at sensing units 25-2 and 25-4 are electrically connected together in a difference circuit, such as the circuit for the sweep sensing photocells shown in FIG. 7, the output of which circuit provides an indication of the direction and magnitude of the lift force along the Y axis. The photocell arrangement is similar to that of the sweep sensing photocells at the orthogonally located sensing units 25-1 and 25-4 and requires no additional description.

The reach sensing photocells $102Z^+$ and $102Z^-$ for force sensing along the Z axis may be located at either diagonally opposite sensing units 25-1 and 25-3 or units 25-2 and 25-4 and, as shown in FIG. 3, are located at the units 25-1 and 25-3. The parallel light beam axes for the photocells $102Z^+$ and $102Z^-$ extend parallel to the X-Y plane at opposite sides thereof. With a positive reach force, it will be seen that the pins 84 move rearwardly with respect to the housings 88, whereby the photocell $102Z^+$ at the forward side of the X-Y plane receives more light and the photocell $102Z^-$ to the rear of the X-Y plane receives less light. Again, the photocell outputs are connected in a difference circuit (such as shown in FIG. 7) having an output magnitude related to the reach force and polarity related to the direction thereof. Also, forces along other axes and torques about the X-Y and X axes either have no effect on the photocell outputs or else produce the same change in both photocell outputs, which changes cancel out in the output from the difference circuit in which the photocell outputs are included.

Torque sensing about the X, Y and Z axes for measurement of the magnitude and direction of tilt, turn and twist, respectively, now will be described. The tilt sensing photocells $102M_x{}^+$ and $102M_x{}^-$ are located at the diametrically opposite sensing units 25-1 and 25-3, with the light beam axes associated therewith extending parallel with the X axis. Both photocells are located at the same side of the X-Y plane and, for purposes of illustration, are shown forwardly thereof in the negative Z direction. It will be apparent, then, that upon application of a tilt torque, light at one photocell is increased while that at the other is decreased. The photocell outputs are included in a difference circuit, such as that shown in FIG. 7, the output from which circuit has a magnitude dependent upon the amount of tilt torque and a polarity dependent upon the direction thereof. The only other movement whic produces a change in the photocell $102M_x{}^+$ and $102M_x{}^-$ outputs is produced by a reach force. It will be noted that positive and negative reach forces result in increased and decreased outputs, respectively, from both photocells, which cancel in the output from the difference circuit.

Torque about the Y axis is measured by use of the photocells $102M_y{}^+$ and $102M_y{}^-$ having outputs connected in a difference circuit arrangement, which photocell and circuit arrangement are similar to those of the X axis torque measurement means described above and need not be described in any further detail.

It will be readily apparent that twist may be measured by photocells located at either pair of diagonally opposite sensing units. In the drawings the photocells $102M_z{}^+$ and $102M_z{}^-$ for twist measurement are located at the sensing units 25-1 and 25-3 at the ends of light passages which extend parallel with the Z axis and which are located at one side of the Z-Y plane. As with all of the other pairs of photocells, the photocell outputs are connected in a difference circuit, an exemplary circuit arrangement being shown in FIG. 7.

Sweep and lift forces which result in translational movement of the pins relative to their associated sensor housings load the coupling means 26 in shear. The amount of movement for any given force will, of course, depend upon the shear stress-strain characteristics of the coupling means. A reach force subjects the coupling means to either a tensile or compressive stress, depending upon direction, and the amount of movement depends upon the tensile and compressive stress-strain characteristics. Torque loading about any axis subjects the coupling means to a combination of tensile and compressive forces. Since the tensile and compressive stress-strain characteristics of a material generally are quite different, it will be apparent that a torque about an axis will result both in a rotational movement and a small translational movement. The accompanying translational movement, however, is not sufficient to grossly adversely effect the outputs from the photocells, including other photocells not utilized in the particular torque measurement, and may be compensated for in the equipment using the sensor.

The coupling means 26 may be selected for the desired properties and stress-strain characteristics for operation of the manipulator within any desired range of force couples. Elastomeric material, such as natural or synthetic rubber, plastic or the like, may be used for the coupling means 26. Other suitable coupling means include resilient beams, coil or leaf springs, or the like, having suitable properties in shear, compression and tension for the intended application. To further alter or extend the operating range, composite coupling means 26 made, for example, of sections or layers of different material may be employed.

Figures 8, 9, 10, 11, 12:
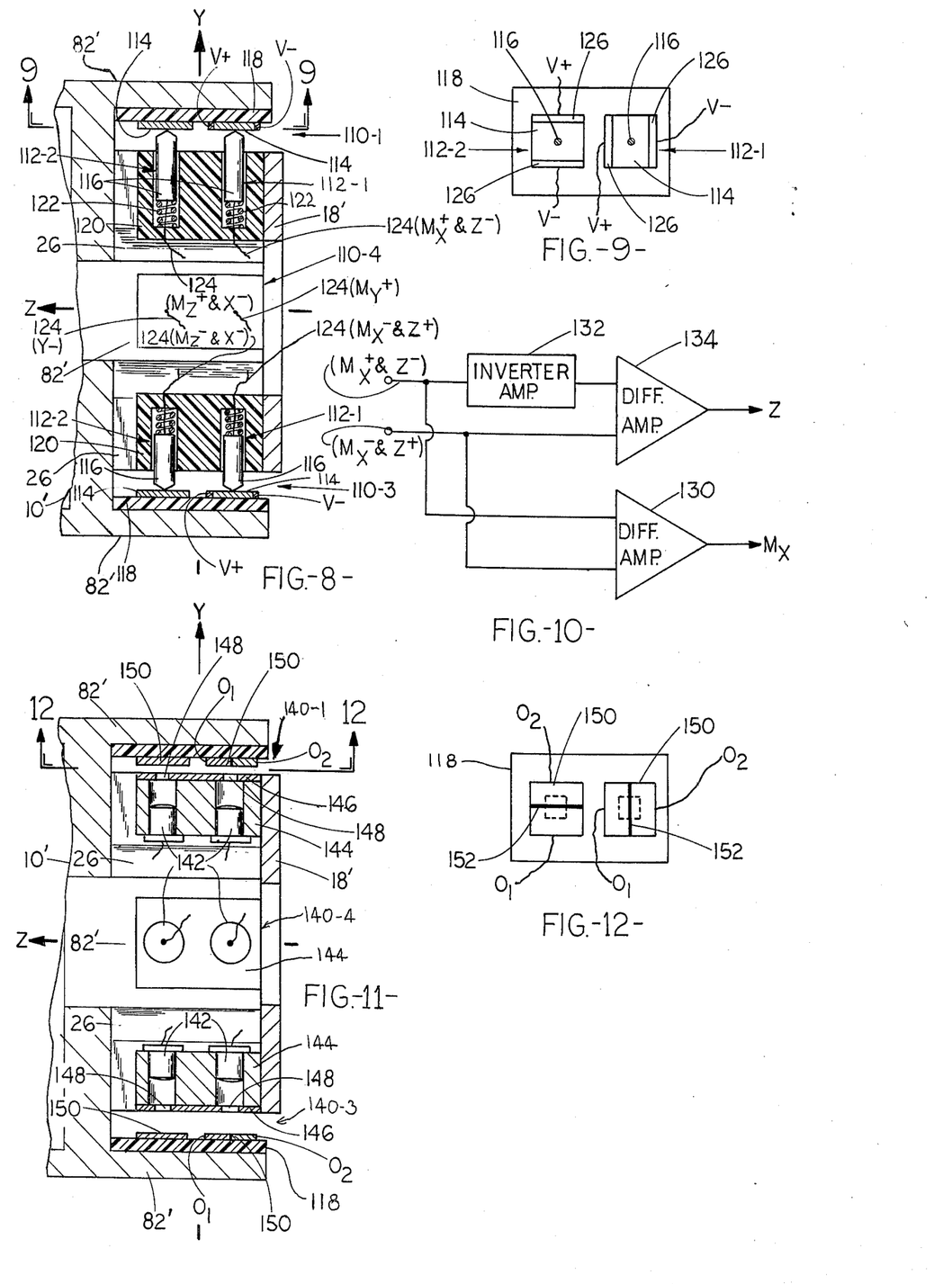
FIG. 8 is a longitudinal sectional view of a coupling means showing a modified form of sensing units employing potentiometers.
FIG. 9 is a sectional view taken along line 9—9 of FIG. 8 showing the resistance elements of the potentiometers.
FIG. 10 is a circuit diagram showing outputs from a pair of potentiometers supplied to two difference circuits having outputs indicative of force and torque at different axes.
FIG. 11 is a longitudinal sectional view of a coupling means showing a further modified form of sensing units employing split photocell elements.
FIG. 12 is a sectional view taken along line 12—12 of FIG. 11 showing the photocell faces.

The sensing method and means are not limited to use with the light beam sensors described above. Other sensing units, including other photocell-type sensors, potentiometer-type sensors and the like, may be used at a radially spaced distance from the resilient coupling for sensing the two perpendicular components of movement mutually perpendicular to the radius therethrough independently of radial motion thereat. Reference is made to FIG. 8 wherein a supporting member 10' is shown connected through resilient coupling means 26 to a supported member 18'. Force and torque sensing units 110-1, 110-3 and 110-4 (together with a fourth sensing unit, not shown) are orthogonally located a radial spaced distance from the longitudinal Z axis of the resiliently coupled members 10' and 18' in a transverse plane extending through said coupling means 26. Here, the sensing units each include two potentiometer-type sensors designated 112-1 and 112-2, one for sensing movement parallel to the Z axis and the other for sensing movement in a direction mutually orthogonal thereto and to the radius therethrough. Each sensor includes a first element comprising a rectangular shaped plate of resistive material 114 and a second element comprising contact 116 relatively movable over the surface of the resistive plate in substantially point contact therewith. The resistive elements 114 are attached to spaced longitudinally extending arms 82' on the supporting member 10' through insulating blocks 118, and the cooperating contacts 116 are carried in blocks 120 of insulating material attached to the supported member 18'. The contacts, which are radially movable within the apertures in the mounting blocks 120, are resiliently biased radially outwardly by springs 122 at the base of the apertures, and output leads 124 are attached to the contacts through said springs.

As also seen in FIG. 9, electrodes 126 are provided along a pair of opposite edges of the resistive elements 114, which electrodes are connected to equal magnitude but opposite polarity potentials V+ and V−. As viewed in FIG. 9, the electrodes 126 for the sensor 112-2 which are parallel to the Z axis are at right angles to the electrodes for the sensor 112-1 which are parallel to the X axis. With the contacts 116 at the center of the resistive elements, no output voltage is obtained therefrom. Movement from the center toward the V+ electrode will result in a positive output, and conversely, movement from the center toward the V− electrode will result in a negative output. It will be seen, then, that each sensor is responsive to relative movement along one axis and is insensitive to movement along the other axes. The pair of sensors 112-1 and 112-2 at any given sensing unit thereby provide outputs indicative of movement from the neutral position along two orthogonal axes mutually orthogonal to a third axis extending radially through the sensing units.

Outputs from sensors at diametrically opposite sensing units are connected to suitable difference circuitry to obtain the desired force and torque output signals. In FIG. 10, to which reference now is made, the outputs from sensors 112-1 at diametrically opposite sensing units 110-1 and 110-3 are shown connected directly to one differential amplifier 130 and are shown connected through an inverter amplifier 132 to another differential amplifier 134. The outputs from the amplifiers 130 and 134 are, therefore, proportional to torque about the X axis and force along the Z axis, respectively. Other pairs of sensor outputs are similarly connected together in arrangements which will be obvious, in view of the above description, to obtain other force and torque components, as desired.

A force and torque sensing means employing sensing units of another modified form is shown in FIGS. 11 and 12, to which FIGS. reference now is made. As with the arrangement of FIG. 8, the supporting and supported members 10' and 18' are coupled together through resilient coupling means 26 to allow for relative movement therebetween upon transmission of forces or torques therethrough. Again, three of the four quadrature spaced sensing units designated 140-1, 140-3 and 140-4 are shown. Each sensing unit includes a pair of light sources 142, such as light emitting diodes, attached to one of the members 10' and 18' for production of radially directed light beams. In the illustrated arrangement, the sources are carried in blocks 144 attached to the member 18' and are positioned to direct light beams radially outwardly through masks 146 having square apertures 148 formed therein. The square cross sectional shaped beams from the apertures impinge upon split photocells 150 having two adjacent light responsive elements at the face thereof. Outputs from the two photocell elements are obtained from output leads designated $O_1$ and $O_2$. At adjacent photocells 150 of a sensing unit, the lines designated 152 between adjacent photocell elements are perpendicular, as seen in FIG. 12, whereby movement in two orthogonal directions mutually orthogonal to the line extending radially through the sensing unit is detected. Photocell outputs from diametrically opposite sensors are connected together in difference circuits in the manner described above for the FIGS. 1–7 arrangement to obtain signals representative of the force and torque components transmitted by the coupling means 26. It will here be noted that outputs from commercial four-quadrant photocells can be combined in sum and difference amplifiers to obtain the same outputs obtained from pairs of two half photocells shown.

The invention having been described in detail in accordance with the requirements of the Patent Statutes, various other changes and modifications will suggest themselves to those skilled in this art. For example, to prevent ambient light errors the wrist sensor employing photocells may be enclosed in an opaque covering or housing (not shown). Also, devices with only one pair of sensing units, such as units 25-1 and 25-3 or units 25-2 and 25-4, may be employed without the other pair for force and torque sensing of a limited nature. Three sensing units spaced around the wrist (as 120° equal spacing) also can be used to sense all three forces and three torques. Here, either by proper placement of photoemitting and photosensitive cells using difference circuits as in FIG. 7 or by using only three pairs of light beams and differential amplifiers to combine the outputs, all three forces and three torques can be separately obtained. It is intended that the above and other such changes and modifications which fall within the spirit and scope of the invention will be covered by the appended claims.

We claim:
1. Sensing means for use in sensing at least one component of force and torque components along mutually orthogonal X, Y and Z axes transmitted between first and second members having a longitudinal axis extending along the Z axis, said sensing means comprising:
resilient coupling means coupling said first and second members to allow for relative movement therebetween and through which said X, Y and Z axes extend;
a plurality of sensing units radially displaced from said Z axis at the resilient coupling means, each of which sensing units includes first and second cooperating means attached to said coupled first and second members, respectively, so that relative movement between said first and second cooperating means is produced upon transmission of forces and torques between said coupled first and second members through said resilient coupling means; said forces and torques being transmitted through said resilient coupling means substantially independently of said sensing units, and means for obtaining at least first and second electrical outputs from each of said sensing units, the outputs from each sensing unit being respectively responsive only to relative movement of said cooperating means along a first direction perpendicular to the radius extending from the Z axis through the associated sensing unit and responsive only to relative movement of said cooperating means along a direction mutually orthogonal to said associated first direction and radius.

2. The sensing means as defined in claim 1 wherein said sensing units are of the non-piezoelectric type.

3. The sensing means as defined in claim 1 wherein:
said plurality of said sensing units are circumferentially spaced about said longitudinal axis at the resilient coupling means; and including
means for connecting electrical outputs from different sensing units together in circuit arrangements having outputs algebraically related to said electrical outputs from said sensing units.

4. The sensing means as defined in claim 1 wherein said first and second cooperating means of each said sensing unit include an opaque member and spaced apart light source and photocell, respectively, arranged so that light from the source is directed toward said photocell past an edge of said opaque member, which opaque member blocks a variable portion of the light preventing the same from reaching the photocell.

5. The sensing means as defined in claim 1 wherein said first and second cooperating means of each of said sensing units include a potentiometer comprising a resistive element with parallel extending terminals along opposite edges thereof and a contact in movable engagement with the resistive element, respectively.

6. The sensing means as defined in claim 1 wherein said first and second cooperating means of each said sensing unit include a pair of adjacent photocell elements and a light source, respectively, arranged so that light from the source is directed radially onto both of said photocell elements.

7. The sensing means as defined in claim 1 which includes:
first and second of said sensing units diametrically oppositely located along said Y axis; said first and second electrical outputs from each of said sensing units being responsive only to relative movement of said cooperating means along directions parallel to said X and Z axes, respectively.

8. The sensing means as defined in claim 7 including:
means for connecting electrical outputs from said first and second sensing units together in circuit arrangements having outputs algebraically related thereto, one of said circuit arrangements having an output indicative of force transmitted along said X axis, and another of said circuit arrangements having an output indicative of torque about the X axis.

9. The sensing means as defined in claim 8 wherein another of said circuit arrangements has an output indicative of torque about the Z axis.

10. The sensing means as defined in claim 8 wherein another of said circuit arrangements has an output indicative of force transmitted along said Z axis.

11. The sensing means as defined in claim 8 including:
a second pair of said sensing units diametrically oppositely located along said X axis, said first and second electrical outputs from each sensing unit of said second pair thereof being responsive only to relative movement of said cooperating means along directions parallel to said Y and Z axes, respectively;
means for connecting the electrical outputs from said second pair of sensing units together in circuit arrangements having outputs indicative of force transmitted along and transmitted torque about said Y axis.

12. Sensing means for use in sensing at least one component of force and torque components along mutually orthogonal X, Y and Z axes transmitted between first and second members having a longitudinal axis extending along the Z axis, said sensing means comprising:
resilient coupling means coupling said first and second members to allow for relative movement therebetween and through which said X, Y and Z axes extend;
at least one sensing unit radially displaced along the Y axis from said Z axis at the resilient coupling means, which sensing unit includes first and second cooperating means attached to said coupled first and second members, respectively, so that relative movement between said first and second cooperating means is produced upon transmission of forces and torques between said coupled first and second members through said resilient coupling means; and
means for obtaining a first electrical output from said sensing unit responsive only to relative movement of said cooperating means along a first direction parallel to said longitudinal axis; said first and second members comprising a manipulator and effector and end effector supporting means, respectively, interconnected by said resilient coupling means.

13. The sensing means as defined in claim 12 wherein said end effector comprises:
a pair of relatively movable members;
a motor for operating said movable members; and
means for mounting said motor along said Z axis at the side opposite sais sensing unit from the manipulator end effector to counterbalance said end effector.

14. Sensing means for use in sensing components of force and torque along mutually orthogonal X, Y and Z axes extending through resilient coupling means coupling first and second members together, said Z axis extending longitudinally therethrough;
at least three sensing units circumferentially spaced about said Z axis about said resilient coupling means;
each of said sensing units including first and second cooperating means attached to said coupled first and second members, respectively, so that relative movement between said first and second cooperating means is produced upon transmission of forces and torques through said resilient coupling means;
means for obtaining first electrical outputs from each of said sensing units responsive only to relative movement of said cooperating means along a direction parallel to said Z axis;
first circuit means;
means for combining said first electrical outputs in said first circuit means for obtaining outputs indicative of torque components about said X and Y axes and the force component along said Z axis;
means for obtaining second electrical output from each of said sensing units responsive only to relative movement of said cooperating means along a direction mutually orthogonal to the radius through said sensing unit and the direction parallel to said Z axis;

second circuit means; and means for combining said second electrical outputs in said second circuit means for obtaining outputs indicative of the force components along said X and Y axes and the torque component about said Z axis.

15. The sensing means as defined in claim 14 wherein there are four of said sensing units circumferentially spaced about the Z axis along said X and Y axes.

16. The sensing means as defined in claim 14 wherein said first and second cooperating means include an opaque member and spaced apart light source and photocell, respectively, arranged so that light from the source is directed toward said photocell past an edge of said opaque member, which opaque member blocks a variable portion of the light preventing the same from reaching the photocell.

17. The sensing means as defined in claim 14 wherein said first and second cooperating means of each sensing unit include a potentiometer comprising a resistive element with parallel extending terminals along opposite edges thereof and a contact in movable engagement with the resistive element, respectively.

18. The sensing means as defined in claim 14 wherein said first and second cooperating means include a pair of adjacent photocell elements and a light source, respectively, arranged so that light from the source is directed radially onto both of said photocell elements.

19. The sensing means as defined in claim 14 wherein said first and second members comprise a manipulator end effector and end effector supporting means, respectively, interconnected by said resilient coupling means.

20. The sensing means as defined in claim 19 wherein said end effector comprises:

a pair of relatively movable members;

a motor for operating said movable members; and means for mounting said motor along said Z axis at the side opposite said sensing unit from the manipulator end effector to counterbalance said end effector.

21. A method of sensing components of torque and force transmitted between first and second members along mutually orthogonal X, Y and Z axes comprising:

attaching said first and second members together by resilient coupling means through which substantially the entire force and torque components are transmitted between said first and second members;

attaching a plurality of two-part sensing units, at circumferentially spaced locations about the Z axis in the plane of the X and Y axes, to said first and second members such that relative movement between the two parts of the sensing units is produced upon transmission of forces and torques through said resilient coupling means;

obtaining first electrical outputs from the sensing units in response to relative movement of the two parts along a direction parallel to the Z axis;

combining the first electrical outputs in different combination to obtain outputs related to torque components about said X and Y axes and the force component transmitted along said Z axis;

obtaining second electrical outputs from the sensing units in response to relative movement of the two parts of each sensing unit along a direction mutually orthogonal to the associated radius through said sensing unit and the direction parallel to the Z axis; and combining the second electrical outputs from the sensing units in different combinations to obtain outputs related to force components transmitted along said X and Y axes and the torque component about said Z axis.

22. Sensing means for use in sensing at least one component of force and torque components transmitted between first and second members having a longitudinal axis extending therebetween comprising:

resilient coupling means coupling said first and second members to allow for relative movement therebetween;

an opaque member located along a radius extending from said longitudinal axis;

housing means having a clearance hole into which said opaque member extends;

means for attaching said opaque member and housing means to said first and second members so that relative movement is produced therebetween upon transmission of force and force moments through said resilient coupling means;

means forming at least one light passage in said housing means which intersects with said clearance hole formed therein; and light source and light sensing means at said light passage with said light sensing means arranged to receive light emitted by said light source after passing an edge of said opaque member which blocks a variable portion of the light depending upon force and force moments transmitted by said resilient coupling means.

23. The sensing means as defined in claim 22 including;

a plurality of said light passages formed in said housing means which intersect with said clearance hole and extending along generally perpendicular axes, and light source and light sensing means at opposite ends of each of said light passages.

* * * * *